(12) United States Patent
Mohammadi

(10) Patent No.: US 8,906,711 B2
(45) Date of Patent: Dec. 9, 2014

(54) METHOD FOR PREPARING TITANIA PASTES FOR USE IN DYE-SENSITIZED SOLAR CELLS

(76) Inventor: Mohammad-Reza Mohammadi, Tehran (IR)

( * ) Notice: Subject to any disclaimer, the term of this patent is extended or adjusted under 35 U.S.C. 154(b) by 1 day.

(21) Appl. No.: 13/539,478

(22) Filed: Jul. 1, 2012

(65) Prior Publication Data

US 2012/0276683 A1  Nov. 1, 2012

(51) Int. Cl.
*H01L 21/00* (2006.01)
*H01B 1/02* (2006.01)
*C01G 23/047* (2006.01)
*B82Y 30/00* (2011.01)
*C01G 23/053* (2006.01)
*B82Y 40/00* (2011.01)
*H01G 9/20* (2006.01)

(52) U.S. Cl.
CPC ............. *B82Y 30/00* (2013.01); *C01P 2006/40* (2013.01); *C01P 2004/04* (2013.01); *C01G 23/047* (2013.01); *C01P 2004/54* (2013.01); *Y02E 10/542* (2013.01); *C01P 2004/03* (2013.01); *C01G 23/053* (2013.01); *B82Y 40/00* (2013.01); *C01P 2004/64* (2013.01); *C01P 2004/52* (2013.01); *H01G 9/2059* (2013.01); *H01G 9/2031* (2013.01); *C01P 2002/88* (2013.01)

USPC ........................... 438/19; 252/519.12

(58) Field of Classification Search
CPC ............................. H01C 7/027; H01L 51/4226
USPC ........................... 438/19; 252/519.12
See application file for complete search history.

(56) References Cited

U.S. PATENT DOCUMENTS

2009/0005238 A1 * 1/2009 Falaras ................... 502/200

OTHER PUBLICATIONS

Mohammad Hossein Habib et al., "Preparation, characterization and photocatalytic activity of TiO2/Methylcellulose nanocomposite films derived from nanopowder TiO2 and modified sol-gel titania", Journal of Material Science, Springer, Apr. 6, 2007, pp. 6027-6035.*
Jin et al., "Enhancement of the photoelectric performance of dye-sensitized solar cells using Ag-doped TiO2 nanofibers in a TiO2 film as electrode", Nanoscale Research Letters, Feb. 2, 2012, pp. 1-5; http://www.nanoscalereslett.com/content/7/1/97.*

* cited by examiner

*Primary Examiner* — William D Coleman

(57) ABSTRACT

A new, more economical method for preparing titania pastes for use in more efficient dye-sensitized solar cells is disclosed. The titania pastes are prepared by mixing titania nanoparticles with a titania sol including a titanium precursor. The disclosed method enables the control of titania nanoparticle concentration and morphology in the titania paste and is economical due to the relatively low reaction temperatures. The performances of dye-sensitized solar cells prepared using the disclosed titania pastes are also disclosed.

17 Claims, 12 Drawing Sheets

600

Preparing a Titania Photoanode Electrode — 602

Receiving a Counter Electrode — 604

Receiving an Electrolyte — 606

Assembling a Dye-Sensitized Solar Cell — 608

METHOD FOR PREPARING TITANIA PASTES FOR USE IN DYE-SENSITIZED SOLAR CELLS

SPONSORSHIP STATEMENT

This application has been financially sponsored for international filing by the Iranian Nanotechnology Initiative Council and the Sharif University of Technology.

TECHNICAL FIELD

This application generally relates to titania pastes, and more particularly relates to a method for preparing titania pastes for use in dye-sensitized solar cells.

BACKGROUND

Dye-sensitized solar cells are a promising energy source due to their potential low-cost. Current research on dye-sensitized solar cells is focused on new methods and materials to improve their energy conversion efficiency, life cycle, and cost. Titania ("titanium dioxide," $TiO_2$) is an n-type wide bandgap semiconductor that absorbs photons in the ultraviolet energy region. As such, in typical dye-sensitized solar cells, dye molecules are adsorbed on a titania layer to allow for photoelectric conversion over a broader spectral range. When sunlight radiates onto the DSSCs, electrons in the highest occupied molecular orbital ("HOMO") in the dye molecules absorb photons from the sunlight and jump to the lowest unoccupied molecular orbital ("LUMO"). The electrons in the LUMO are then injected into and pass through the titania layer to a transparent conductive oxide coated on a substrate and then to a load to provide electricity. The newly vacant HOMO is supplied with electrons from iodide ions ($I^-$) when iodide is oxidized to triiodide ($I^{3-}$). Meanwhile, a platinum counter electrode acts as catalyst to reduce the triiodide back to iodide.

Titania particles having higher surface areas in the titania layer allow for the adsorption of a larger number of dye molecules needed for light-harvesting, thereby improving the efficiency of dye-sensitized solar cells. In addition, better intramolecular connections between the titania particles and better adhesion of the titania particles to the transparent conductive oxide diminish reactions between the photogenerated electrons and the triiodide to improve the electrical conductivity in the dye-sensitized solar cells. Therefore, to improve the efficiency and lower the cost of dye-sensitized solar cells, a new, more economical method of preparing titania pastes including improved morphologies of titania nanoparticles for use in dye-sensitized solar cells is needed.

SUMMARY

A method for preparing titania pastes for use in dye-sensitized solar cells is disclosed. Initially, a titanium precursor, a catalyst, and distilled water are mixed to prepare a titania sol. Titania nanoparticles having an average size of less than 100 nm are then received. Finally, the titania sol and the titania nanoparticles are mixed to prepare a titania paste.

In some implementations, the titanium precursor can be titanium tetraisopropoxide and the catalyst can be an acid. The acid can be hydrochloric acid. The titanium precursor, the catalyst, and the distilled water can be mixed at room temperature. The molar ratio of the titania nanoparticles to the titanium precursor in the titania sol can be between 5:1 and 8:1. The titania sol and the titania nanoparticles can be mixed at room temperature.

In some implementations, the titania nanoparticles can be received from another source. In some implementations, the titania nanoparticles can be synthesized by drying a portion of the titania sol to form titania nanoparticles and annealing the titania nanoparticles at a temperature between 300° C. and 1000° C. The titania nanoparticles can be annealed at a temperature between 400° C. and 700° C., or at 500° C.

In some implementations, the titania sol, the titania nanoparticles, and a dispersing agent can be mixed to prepare the titania paste. The dispersing agent can be hydroxypropyl cellulose with an average molecular weight of greater than or equal to 100,000 grams per mol. The weight ratio of the dispersing agent to the titania nanoparticles can be between 10:90 and 40:60.

In some implementations, the titania sol, the titania nanoparticles, and a metal solution or powder can be mixed to prepare a metal-doped titania paste. The metal solution or powder can include a metal selected from the group consisting of silver, zinc, cerium, and zirconium.

In some implementations, the titania sol, the titania nanoparticles, and a metal oxide solution or powder can be mixed to prepare a metal oxide-doped titania paste. The metal oxide solution or powder can include a metal oxide selected from the group consisting of tantalum oxide, erbium oxide, zirconia, gallium oxide, silver(I,III)oxide, and ceria.

In some implementations, a substrate can be coated with the titania paste to prepare a titania coated substrate. The titania coated substrate can then be annealed at a temperature of 400° C. Finally, the annealed titania coated substrate can be sensitized with a dye solution to prepare a sensitized titania photoanode electrode for use in dye-sensitized solar cells.

Another method for preparing titania pastes for use in dye-sensitized solar cells is also disclosed. Initially, a titanium precursor, an acid, and distilled water are mixed at room temperature to prepare a titania sol. A portion of the titania sol is then dried to form titania nanoparticles having an average size of less than 100 nm. Next, the titania nanoparticles are annealed at a temperature between 300° C. and 1000° C. Finally, the titania sol, the titania nanoparticles, and a dispersing agent are mixed at room temperature to prepare a titania paste.

Details of one or more implementations and/or embodiments of the method for preparing titania pastes for use in dye-sensitized solar cells are set forth in the accompanying drawings and the description below. Other aspects that can be implemented will be apparent from the description and drawings, and from the claims.

BRIEF DESCRIPTION OF DRAWINGS

Like reference symbols indicate like elements throughout the specification and drawings.

DETAILED DESCRIPTION

A new, more economical method for preparing titania pastes for use in more efficient dye-sensitized solar cells is disclosed. The titania pastes are prepared by mixing titania nanoparticles with a titania sol including a titanium precursor. The disclosed method enables the control of titania nanoparticle concentration and morphology in the titania paste and is economical due to the relatively low reaction temperatures. The performances of dye-sensitized solar cells prepared using the disclosed titania pastes are also disclosed.

Figure 1:
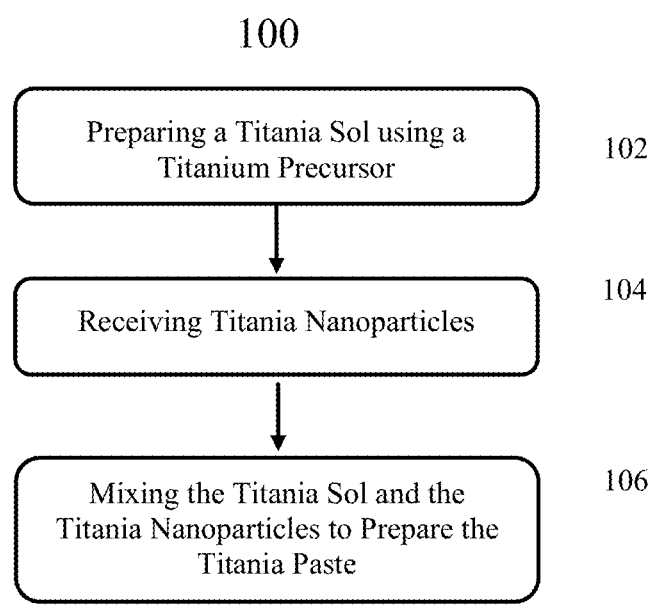
FIG. 1 illustrates an example of a method for preparing titania pastes for use in dye-sensitized solar cells.

Referring to FIG. 1, an example of a method 100 for preparing titania pastes for use in dye-sensitized solar cells is illustrated. Initially, a titania sol is prepared using a titanium precursor (step 102). In some implementations, the titania sol can be prepared using an aqueous particulate sol-gel process. The titanium precursor can be, for example, titanium tetraisopropoxide ("TTIP;" tetraisopropyl titanate; $Ti(OC_3H_7)_4$) and/or titanium tetrabutoxide ("TTB;" titanium butoxide; $Ti(OC_4H_9)_4$). In some implementations, preferably, the titania precursor can be titanium tetraisopropoxide.

In some implementations, the titania sol includes distilled water ($H_2O$) as a dispersing medium and a catalyst for peptisation. The catalyst can be an acid, such as, for example, hydrochloric acid (HCl), nitric acid ($HNO_3$), and/or acetic acid ($CH_3COOH$).

Initially, to prepare the titania sol, distilled water and a catalyst are mixed. While continuously stirring the solution, the titanium precursor is added to form a thick white precipitate, which is gradually peptized to prepare a clear titania sol. In some implementations, for example, the titania sol can be prepared at room temperature of about 20° C. to 25° C.

Next, titania nanoparticles are received (step 104). The titania nanoparticles have an average size of less than or equal to 100 nm. In some implementations, the titania nanoparticles can be received in powder form from another source. The titania nanoparticles received from another source can be selected based on desired characteristics for the titania nanoparticles, such as purity, shape, phase composition, and/or size. For example, titania nanoparticles having an average size of less than 50 nm can be received. In another example, titania nanoparticles having nanowire morphologies can be received in step 104.

In other implementations, reception of the titania nanoparticles can include synthesizing titania nanoparticles from a portion of the titania sol prepared in step 102. In particular, titania nanoparticles can be synthesized from a portion of the titania sol by initially drying the titania sol. The titania sol can be dried at room temperature of about 20° C. to 25° C. or in a heated environment. In some implementations, preferably, the titania sol is dried at room temperature to prevent crystal growth.

Next, the resulting titania powder can be annealed at a temperature ranging from 300° C. to 1000° C. The phase composition, i.e., anatase and/or rutile, crystallite size, crystal structure, specific surface area, packing, and/or ordering of the synthesized titania nanoparticles can be specified by selecting a corresponding annealing temperature, as explained in greater detail below.

Finally, the titania sol and the titania nanoparticles are mixed to prepare the titania paste (step 106). In some implementations, the titania sol is mixed with the titania nanoparticles at room temperature of about 20° C. to 25° C. for a relatively short time period of about five minutes to 15 minutes. The molar ratio of the titania nanoparticles to the titanium tetraisopropoxide in the titania sol in the titania paste can range from 5:1 to 8:1.

A dispersing agent can then be added to the titania paste mixture. The dispersing agent can be hydroxypropyl cellulose with an average molecular weight of about 100,000 grams per mol or greater. The weight ratio of the dispersing agent to the titania nanoparticles in the titania paste can range from 10:90 to 40:60. The titania paste including the titania sol, titania nanoparticles, and dispersing agent can be continuously stirred at room temperature of about 20° C. to 25° C. for more than 15 minutes.

In some implementations, other metals and/or metal oxides can be added to the titania paste to prepare doped-titania pastes and/or titania based binary metal oxide pastes, respectively. In some implementations, any metal and/or metal oxide solutions and/or powders can be added to the titania paste. For example, metal and/or metal oxide solutions and/or powders including silver (Ag), zinc (Zn), cerium (Ce), zirconium (Zr), tantalum oxide ($Ta_2O_5$), erbium oxide ($Er_2O_3$), zirconia (zirconium oxide, $ZrO_2$), gallium oxide ($Ga_2O_3$), silver(I,III) oxide (AgO), and/or ceria (cerium(IV) oxide; ceric oxide; $CeO_2$) can be added to the titania paste. In some implementations, the metal and/or metal oxide solutions and/or powders can be separate from the titania sol and titania nanoparticles and added separately to the titania paste, while in other implementations, the metal salts can be added to the titania sol at predetermined concentrations to prepare doped-titania and/or titania based binary metal oxide nanoparticles depending on the metal salt concentration.

In comparison with known methods for preparing titania pastes, the method 100 for preparing titania pastes for use in dye-sensitized solar cells offers several advantages. First, because the titania paste is prepared by mixing the titania sol and titania nanoparticles at room temperature of about 20° C. to 25° C., the method 100 uses less energy and is, therefore, more economical relative to known methods that perform a hydrothermal synthesis at temperatures typically exceeding 200° C. Moreover, the method 100 can be completed in less than three hours, which is significantly less than the typical 24 hours or more required by known methods, resulting in additional energy and time savings.

Second, because the titania nanoparticles are added to the titania sol to prepare the titania paste in the method 100, the types of titania nanoparticles and the concentration of titania nanoparticles in the titania paste can be controlled. For example, titania nanoparticles having a specific average size and/or a narrow size distribution can be received or synthesized and then mixed with the titania sol. Moreover, any concentration of titania nanoparticles can be added to the titania paste depending on the specific application of the titania paste. For example, a titania paste having a relatively high concentration, i.e., over 50%, of titania nanoparticles can be prepared by the method 100. However, known methods that heat a titania sol to obtain titania nanoparticles within the titania sol cannot accurately control the average size or concentration of the titania nanoparticles in the titania paste because of rapid particle growth at high temperatures.

Third, hydroxypropyl cellulose with a relatively high average molecular weight of 100,000 grams per mol can be used as the dispersing agent to prepare the titania paste. Due to the relatively high average molecular weight of the dispersing agent, the porosity of a titania photoanode in a dye-sensitized solar cells prepared using the titania paste of the method 100 is higher than the porosity of titania photoanode prepared with known titania pastes, which can result in higher power conversion efficiency.

Titania Paste Preparation Example

Initially, a titania sol is prepared by an aqueous particulate sol-gel process (corresponding to step 102). Hydrochloric acid as a catalyst and distilled water as a dispersing medium are mixed at room temperature of about 20° C. to 25° C. at a molar ratio of hydrochloric acid to distilled water of 0.5: 351.3. Next, one mole of titanium tetraisopropoxide as a titanium precursor is added to the solution under continuous stirring, forming a thick, white precipitate. Finally, the sol is peptized for about two hours to form a clear titania sol.

Figure 2:
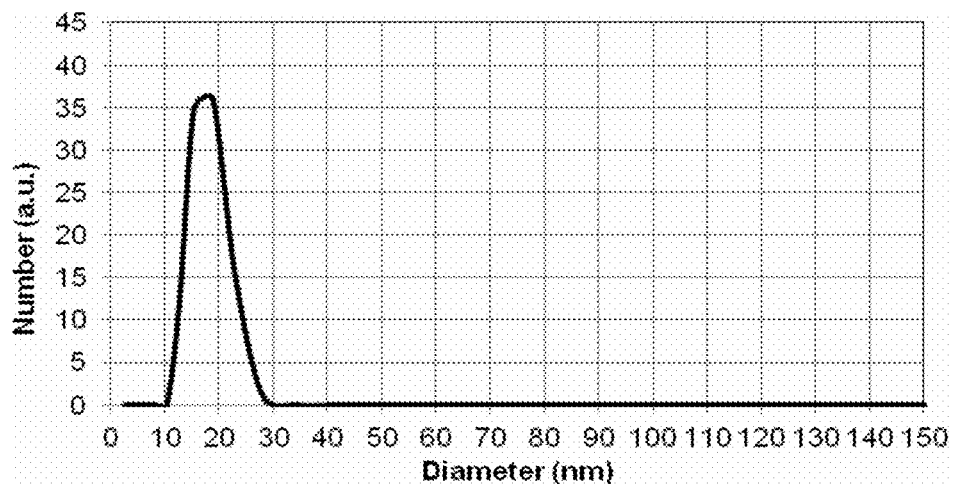
FIG. 2 illustrates the size distribution of titania nanoparticles in a titania sol prepared according to the TITANIA PASTE PREPARATION EXAMPLE.

Referring to FIG. 2, the size distribution of the titania nanoparticles in the titania sol is illustrated. As shown in FIG. 2, the titania nanoparticles exhibit a narrow size distribution ranging from about 10 nm to about 27 nm with an average particle size of 19 nm. The zeta potential of the titania nanoparticles is 51 mV at a pH of two, confirming high aging stability of the titania sol. The high stability of the titania sol against aggregation is due to the mechanism of electrostatic stabilization that results from the distribution of charged species in a sol. During experimentation, it was found that the titania sol was stable for at least seven months.

Next, titania nanoparticles are synthesized from a portion of the titania sol (corresponding to step 104). The titania sol is first dried at room temperature until a titania powder including titania nanoparticles is formed. The titania powder is then annealed at a temperature of at least 300° C. for about one hour to tailor the crystal structure of the titania nanoparticles. In particular, during experimentation, six samples of the titania powder at different annealing temperatures were analyzed. The annealing temperatures, phase compositions determined according to X-ray diffraction ("XRD"), and crystallite size determined according to the Scherrer equation of the six samples are shown in TABLE 1, below.

TABLE 1

| Sample | Annealing Temperature | Crystallinity | Anatase | Rutile | Average Crystallite Size |
|---|---|---|---|---|---|
| I | None | Almost amorphous | 100% | 0% | 3.1 nm |
| II | 300° C. | Crystalline | 100% | 0% | 4.0 nm |
| III | 500° C. | Crystalline | 75.5% | 24.5% | 4.5 nm |
| IV | 600° C. | Crystalline | 70% | 30% | 5.8 nm |
| V | 700° C. | Crystalline | 6% | 94% | 8.8 nm |
| VI | 800° C. | Crystalline | 0% | 100% | 10.8 nm |

As shown in TABLE 1, before annealing, the titania nanoparticles are almost amorphous with anatase phase composition and an average crystallite size of 3.1 nm. A complete crystalline anatase phase composition was observed after annealing at 300° C., although the average crystallite size increased to 4.0 nm. As the annealing temperature was increased to 500° C., 600° C., and 700° C., the phase composition shifted from anatase to rutile and the average crystallite size gradually increased from 4.5 nm to 8.8 nm. At an annealing temperature of 800° C., a complete crystalline rutile phase composition was observed with the largest average crystallite size of 10.8 nm. As such, it can be concluded that the phase composition of the titania nanoparticles shifts from anatase to rutile between 300° C. and 500° C. and, as explained in greater detail below, about 400° C. Moreover, it can also be concluded that the average crystallite size of the rutile phase titania nanoparticles is greater than the anatase phase, which is due to the formation of rutile nuclei within the anatase nanoparticles.

Figure 3:
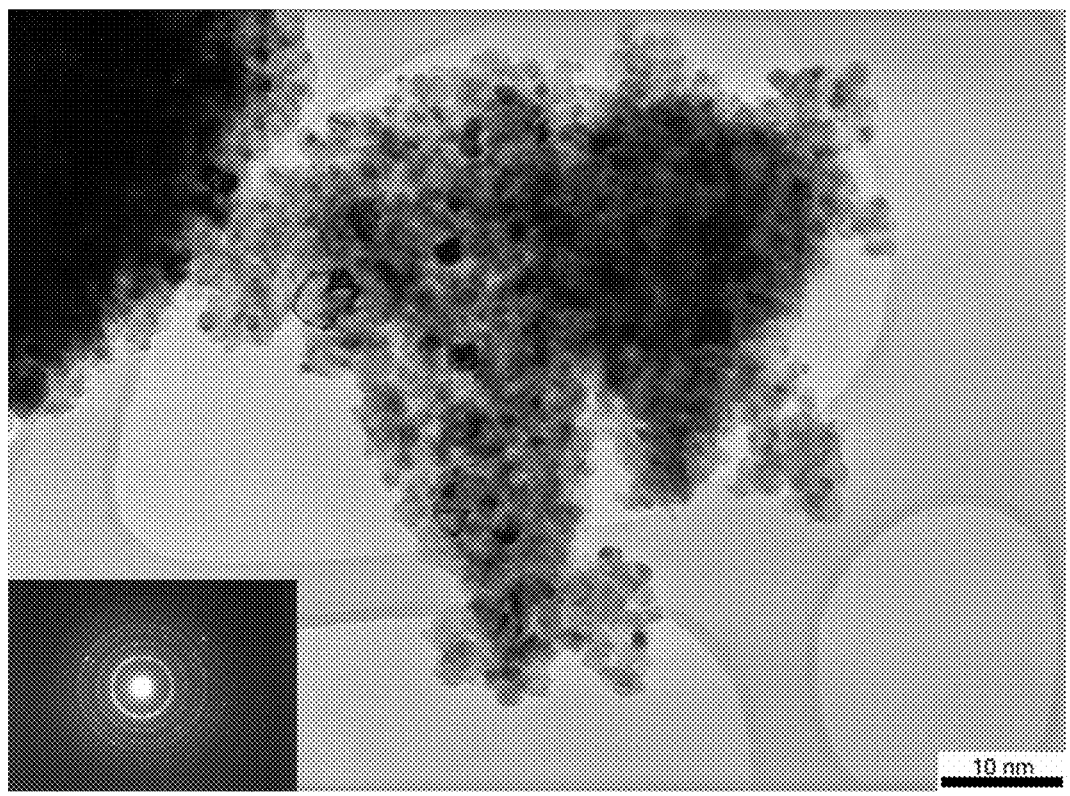
FIG. 3 illustrates a transmission electron microscopy image of titania nanoparticles annealed at 300° C. and prepared according to the TITANIA PASTE PREPARATION EXAMPLE.

Referring to FIG. 3, a transmission electron microscopy ("TEM") image of titania nanoparticles annealed at 300° C. is illustrated. As shown in FIG. 3, the titania nanoparticles exhibit narrow particle size distribution. Furthermore, the inset shows typical well-defined rings arising from crystallite structures with crystallite size of about 4 nm, which is consistent with the crystallite size determined by XRD analysis.

Figure 4:
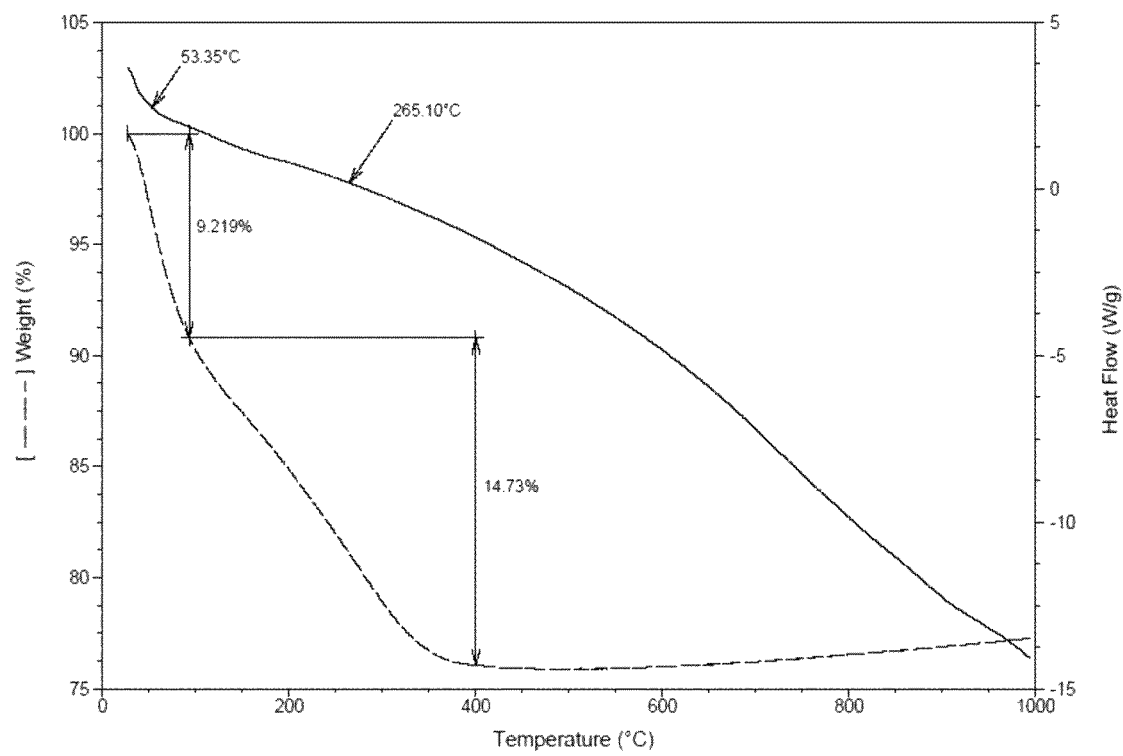
FIG. 4 illustrates a simultaneous differential thermal analysis of as-synthesized titania powder (i.e., before annealing) prepared according to the TITANIA PASTE PREPARATION EXAMPLE.

Referring to FIG. 4, a simultaneous differential thermal analysis of the dried titania powder before annealing (i.e., as-synthesized powder) is illustrated. The heating rate of the simultaneous differential thermal analysis is 5° C. per minute in an atmosphere of air. As shown in FIG. 4, the titania powder undergoes a weight loss of 9.22% between room temperature and 90° C. due to the evaporation of physically adsorbed water from the pores of the titania powder and a weight loss of 14.73% between 90° C. and 400° C. due to dihydroxylation and the removal of residual organics. An exothermic broad peak at 265° C. is indicative of slow crystallization of the anatase phase. There is no additional weight loss at temperatures above 400° C. and, therefore, 400° C. is an appropriate annealing temperature for the complete removal of organic constituents from the titania powder.

Next, titania paste is prepared by mixing the titania sol and the titania nanoparticles (corresponding to step 106). The titania sol and the titania nanoparticles are mixed at room temperature of about 20° C. to 25° C. for about ten minutes. The molar ratio of the titania nanoparticles to the titanium tetraisopropoxide is 7:1. Hydroxypropyl cellulose with an average molecular weight of about 100,000 grams per mol is then added to the solution under continuous stirring as a dispersing agent. The weight ratio of the hydroxypropyl cellulose to the titania nanoparticles is 30:70. The titania sol, the titania nanoparticles, and the hydroxypropyl cellulose are continuously stirred at room temperature of about 20° C. to 25° C. for about 30 minutes to prepare the titania paste.

Figure 5:
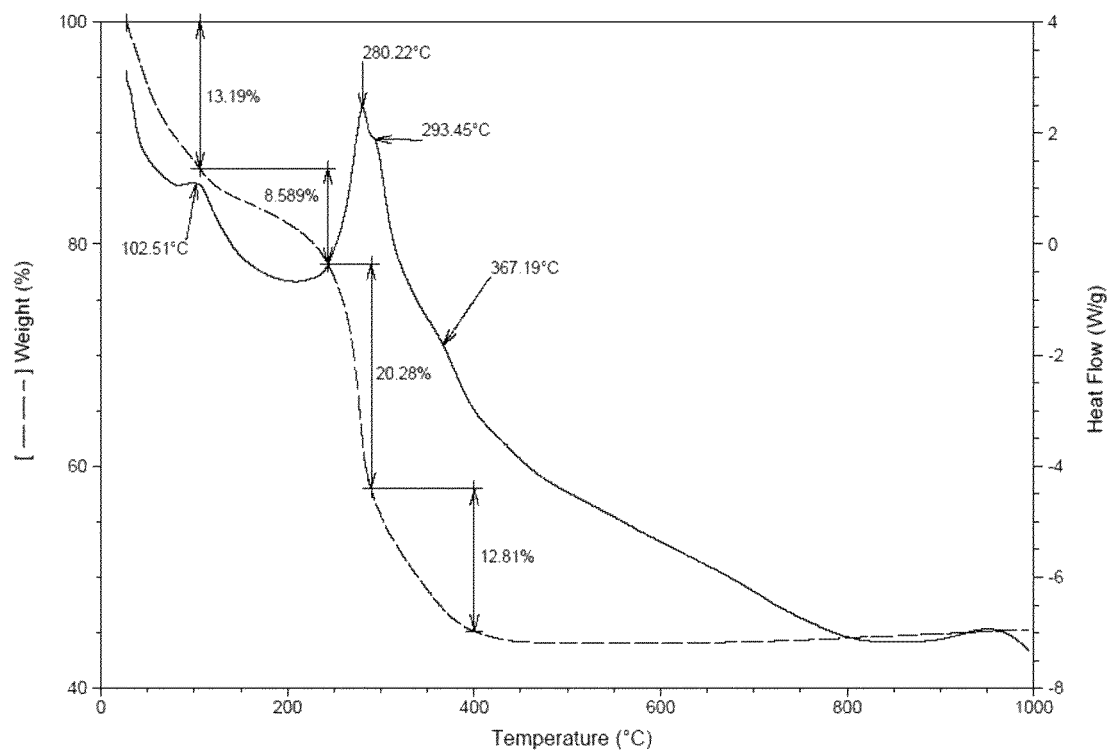
FIG. 5 illustrates a simultaneous differential thermal analysis of titania paste prepared according to the TITANIA PASTE PREPARATION EXAMPLE.

Referring to FIG. 5, a simultaneous differential thermal analysis of the titania paste is illustrated. The heating rate of the simultaneous differential thermal analysis is 5° C. per minute in an atmosphere of air. As shown in FIG. 5, the anatase exothermic peak of the titania paste occurs at 102.51° C. Due to the presence of hydroxypropyl cellulose, the two exothermic peaks corresponding to organic decomposition occur at 280.22° C. and 293.45° C. The exothermic peak corresponding to the anatase to rutile phase transformation occurs at 367.19° C.

Furthermore, as illustrated in FIG. 5, the titania paste undergoes weight loss in four stages. In the first stage between room temperature and 102.51° C., the weight loss is 13.19% as a result of the evaporation of water. In the second stage between 102.51° C. and about 243° C., the weight loss is 8.59% due to the further evaporation of water. In the third stage between about 243° C. and 293.45° C., the weight loss is 20.28% due to decomposition of residual organics. In the fourth stage between 293.45° C. and 400° C., the weight loss is 12.81% due to further decomposition of residual organics. There is no additional weight loss at temperatures above 400° C. and, as for the titania powder, 400° C. is an appropriate annealing temperature for the complete removal of organic constituents from the titania paste.

Figure 6:
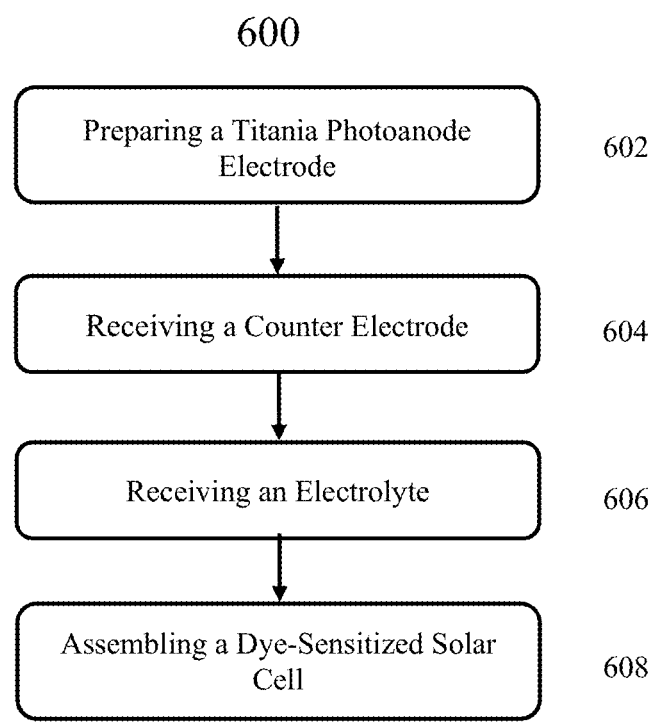
FIG. 6 illustrates an example of a method for preparing a dye-sensitized solar cell using the titania paste prepared by the method of FIG. 1.

Referring to FIG. 6, an example of a method 600 for preparing a dye-sensitized solar cell using the titania paste prepared in the method 100 is illustrated. Initially, a titania photoanode electrode is prepared (step 602). To prepare the titania photoanode, the titania paste is first coated on an indium tin oxide substrate ("ITO") or a fluorine-doped tin oxide ("FTO") substrate and then annealed. In some implementations, for example, the titania paste can be annealed at about 400° C., which is significantly lower and more energy efficient than the typical annealing temperatures of over 450° C. of known methods for preparing titania photoanodes. Following cooling of the titania coated substrate to between 50° C. and 100° C., the titania coated substrate is immersed in a dye solution to sensitize the titania to sunlight and then cooled again to room temperature to prepare the titania photoanode. In some implementations, the dye can be a ruthenium-based dye. In contrast with known methods for preparing titania photoanodes, neither post-treatment with titanium tetrachloride was performed nor was a light-scattering layer or anti-reflecting layer deposited on the titania photoanode.

Next, a counter electrode is received (step 604). The counter electrode can be a metal-coated substrate. The metal can be, for example, gold (Au), platinum (Pt), and/or silver (Ag). The substrate can be, for example, a transparent conductive oxide ("TCO") coated glass, such as ITO and FTO. In some implementations, the counter electrode can be received from another source, whereas in other implementations, the counter electrode can be prepared.

Next, an electrolyte is received (step 606). The electrolyte can be a liquid based electrolyte and, in some implementations, include iodide ions ($I^-$). In some implementations, the electrolyte can be received from another source, whereas in other implementations, the electrolyte can be prepared.

Finally, the dye-sensitized solar cell is assembled (step 608). The sensitized titania photoanode electrode and the counter electrode are first assembled into a sandwich-type cell and sealed. The electrolyte is then introduced in between the two electrodes to complete assembly of the dye-sensitized solar cell.

Dye-Sensitized Solar Cell Preparation Example

Initially, a titania photoanode electrode is prepared (corresponding to step 602). The titania paste prepared by the method 100 is first spin coated on a FTO glass substrate with a sheet resistance of seven Ω/square. The titania coated glass substrate is then annealed at about 400° C. for 30 minutes. After cooling to about 80° C., the titania coated glass substrate is immersed into a 0.5 mM ruthenium-based N719 dye solution. The N719 dye solution includes acetonitrile ($CH_3CN$) and tertbutyl alcohol ($C_4H_{10}O$) as solvents at a volume ratio of 1:1. The titania coated glass substrate is then maintained in the dye solution at room temperature of about 20° C. to 25° C. for about 24 hours to assure complete dye uptake.

Figure 7A:
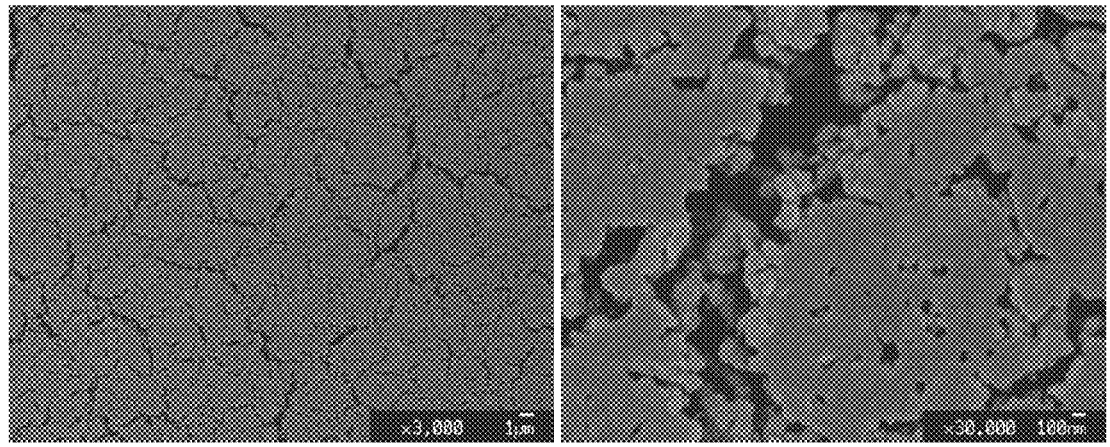
FIGS. 7a-7f illustrate scanning electron microscopy images showing the surface morphology of titania photoanode electrodes prepared using titania pastes prepared according to the TITANIA PASTE PREPARATION EXAMPLE.
Figure 7B:
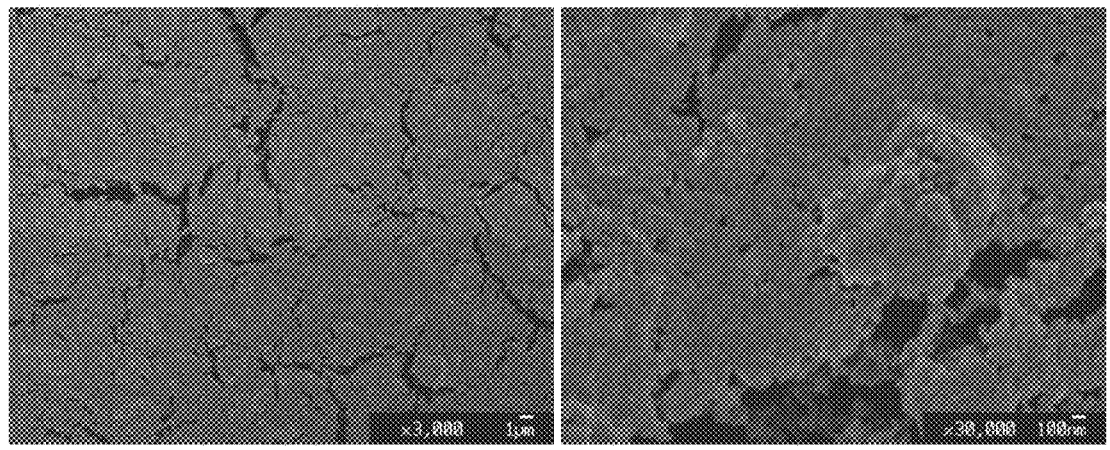
Figure 7C:
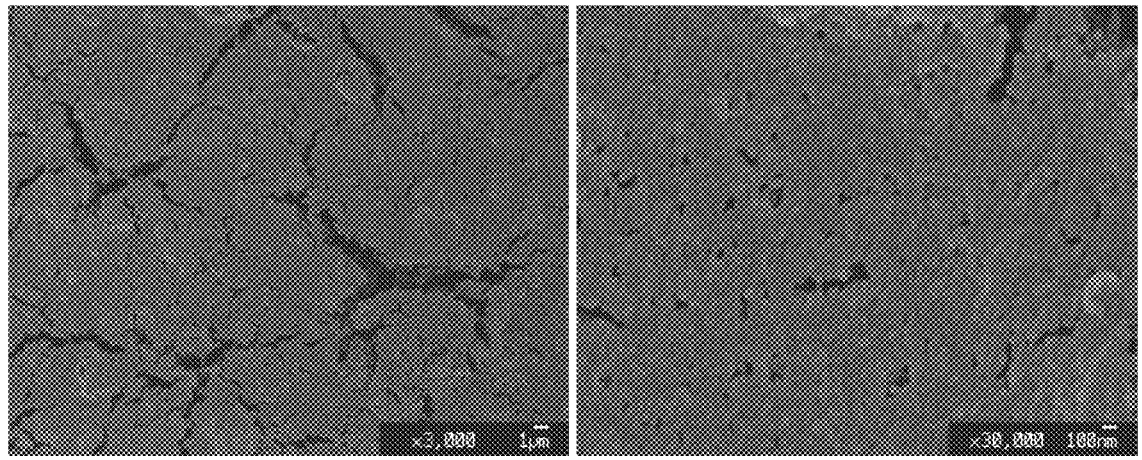
Figure 7D:
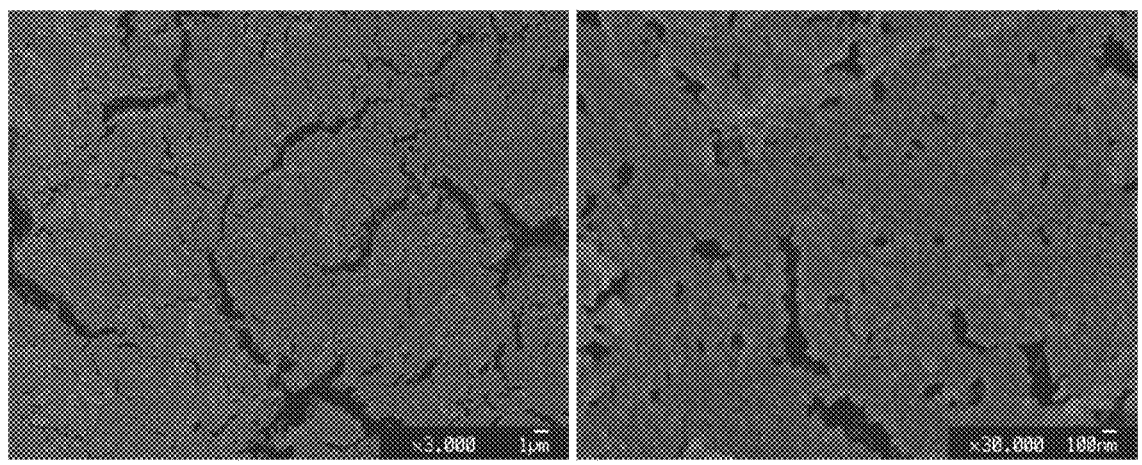
Figure 7E:
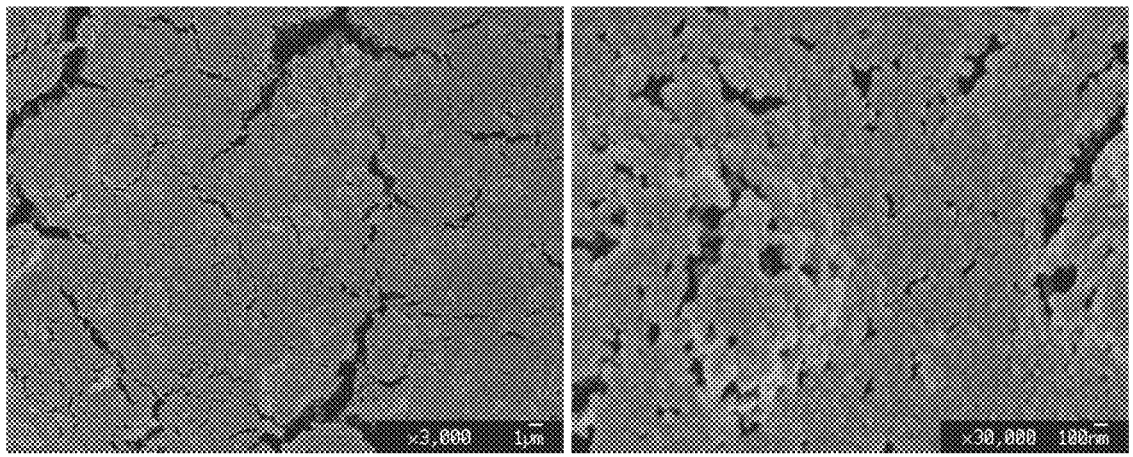
Figure 7F:
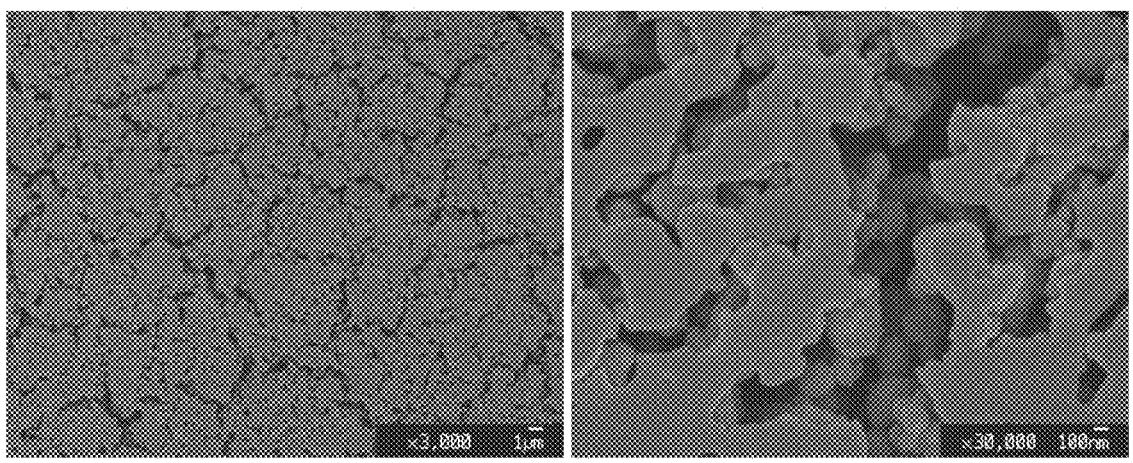

Referring to FIGS. 7a-7f, scanning electron microscopy ("SEM") images showing the surface morphology of titania photoanode electrodes prepared using titania pastes including titania nanoparticles of samples I-VI of TABLE 1 are illustrated. FIG. 7a illustrates a titania photoanode prepared using the titania paste including the titania nanoparticles of sample I that were not annealed, FIG. 7b illustrates a titania photoanode prepared using the titania paste including the titania nanoparticles of sample II that were annealed at 300° C., FIG. 7c illustrates a titania photoanode prepared using the titania paste including the titania nanoparticles of Sample III that were annealed at 500° C., FIG. 7d illustrates a titania photoanode prepared using the titania paste including the titania nanoparticles of Sample IV that were annealed at 600° C., FIG. 7e illustrates a titania photoanode prepared using the titania paste including the titania nanoparticles of Sample V that were annealed at 700° C., and FIG. 7f illustrates a titania photoanode prepared using the titania paste including the titania nanoparticles of Sample VI that were annealed at 800° C.

As shown in FIGS. 7a-7f, the surfaces of the titania photoanodes are uniform and homogeneous with titania nanoparticles having average grain sizes of between 50 nm and 70 nm. The surfaces of the titania photoanodes are also porous with irregular pore shapes resulting from the removal of hydroxypropyl cellulose at the annealing temperature of 400° C. The titania photoanodes made with the unannealed anatase titania nanoparticles, corresponding to sample I and FIG. 7a, and the pure rutile titania nanoparticles, corresponding to sample VI and FIG. 7f, have a similar morphology containing titania nanoparticles covered with a surface layer of residual organic compound resulting from the dispersing agent, i.e., hydroxypropyl cellulose, and a porous structure. However, the average grain size of sample VI is greater than that of sample I.

The surface of the titania photoanodes including mixed anatase and rutile titania nanoparticles, corresponding to samples III-V and FIGS. 7c-e, have a similar morphology containing titania nanoparticles without a hydroxypropyl cellulose surface layer. As such, the porosity of the titania photoanodes including mixed anatase and rutile titania nanoparticles is lower than that of the titania photoanodes made with the unannealed anatase and completely rutile titania nanoparticles. Therefore, depending on the phase composition of the titania nanoparticles, the hydroxypropyl cellulose can either cover multiple titania nanoparticles simultaneously, as in samples I and VI, or cover the individual titania nanoparticles, as in samples III-V.

Figure 8:
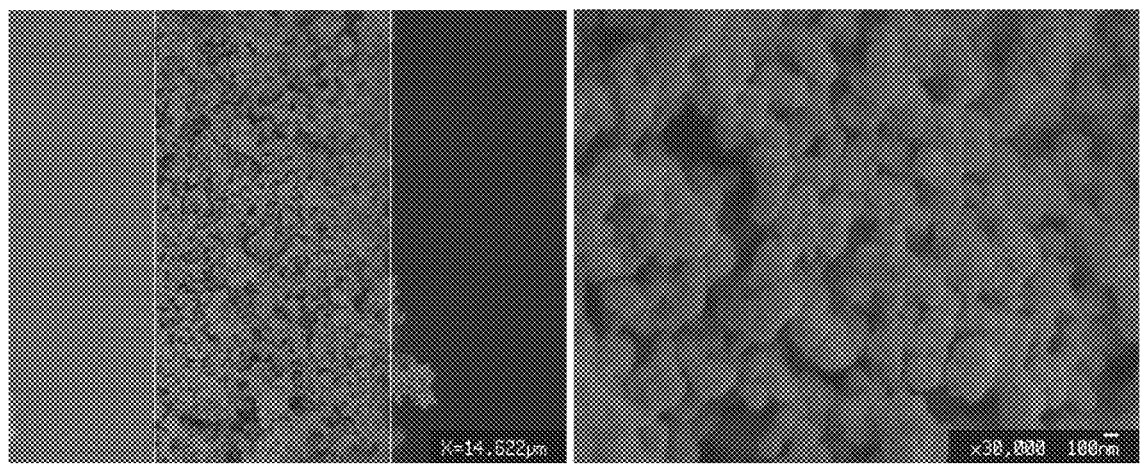
FIG. 8 illustrates a scanning electron microscopy image of a cross-section of a titania photoanode electrode prepared using a titania paste including titania nanoparticles annealed at 400° C.

Referring to FIG. 8, an SEM image of the cross-section of the titania photoanode electrode that is prepared using the titania paste including the titania nanoparticles of sample II that were annealed at 300° C. is illustrated. The thickness of the titania layer can be controlled by the spin coating parameters and it is known that titania layers with thicknesses between 12 μm and 16 μm result in maximum power conversion efficiency in dye-sensitized solar cells. As shown in FIG. 8, the titania layer has a thickness of 14.62 μm.

Next, a platinum counter electrode is prepared (corresponding to step 604). Chloroplatinic acid ($H_2PtCl_6$) is repeatedly dropped on an FTO glass substrate and then heat treated at 400° C. for about 15 minutes to prepare the platinum counter electrode.

Next, an electrolyte is prepared (corresponding to step 606). The electrolyte includes iodide ions and is prepared by mixing 0.60 M of tetrabutylammonium iodide ($C_{16}H_{36}IN$), 0.03 M of iodine ($I_2$), 0.10 M of lithium iodide (LiI), 0.10 M of guanidinium thiocyanate ("GITC;" $C_2H_6N_4S$), and 0.50 M of 4-tertbutylpyridine ($C_9H_{13}N$) in a mixture of acetonitrile and valeronitrile ($CH_3(CH_2)_3CN$) at a volume ratio of 85:15.

Finally, the dye-sensitized solar cell is assembled (corresponding to step 608). The titania photoanode electrode with a size of 0.275 cm² and the platinum counter electrode are first assembled into a sandwich type cell and sealed with a thermoplastic to create a seal with a thickness of about 60 μm. A small hole is created in the seal, a drop of the electrolyte is placed on the hole, and the electrolyte is introduced into the cell via vacuum backfilling.

Figure 9:
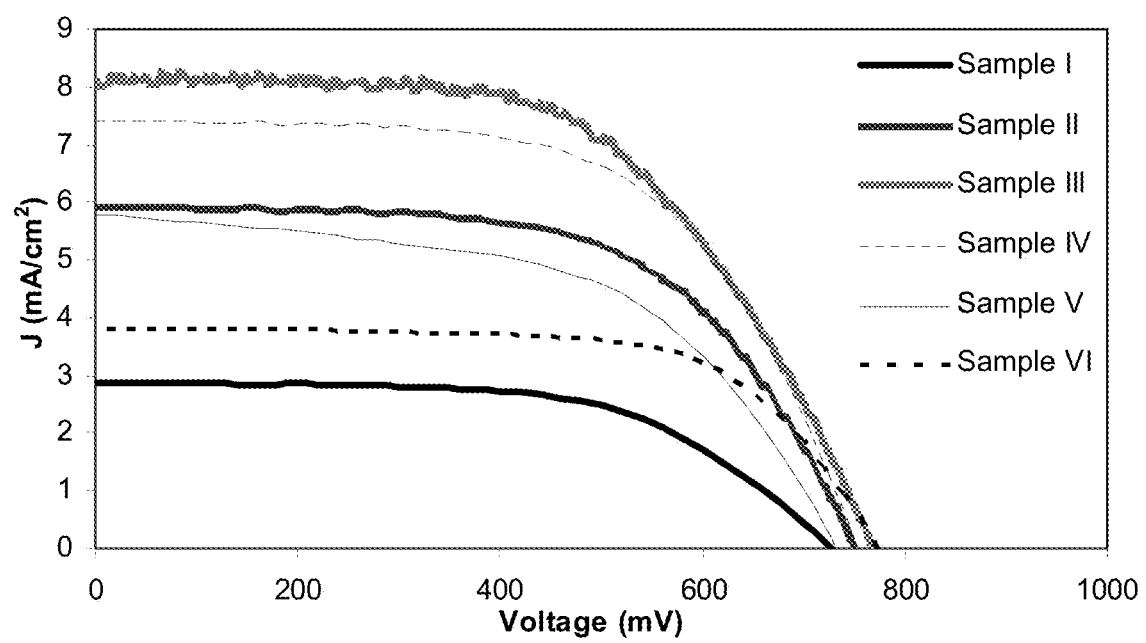
FIG. 9 illustrates photocurrent-voltage characteristics of dye-sensitized solar cells prepared according to the DYE-SENSITIZED SOLAR CELL PREPARATION EXAMPLE.

Referring to FIG. 9, the photocurrent-voltage characteristics of the prepared dye-sensitized solar cells using the titania pastes including the titania nanoparticles of samples I-VI are illustrated. The corresponding photovoltaic parameters of the prepared dye-sensitized solar cells using the titania pastes including the titania nanoparticles of samples I-VI are shown in TABLE 2. The photovoltaic measurements were determined using a solar simulator using an irradiance of 100 mW/cm², AM 1.5 spectrum, and a cell temperature 25° C. The short circuit current density ("Jsc"), open circuit voltage ("$V_{OC}$"), fill factor ("FF"), the photon-to-electron conversion efficiency ("IPCE"), and power conversion efficiency ("η") for each dye-sensitized solar cell are listed in TABLE 2.

TABLE 2

| Sample | $J_{SC}$ (mA/cm²) | $V_{OC}$ (mV) | FF (%) | IPCE (%) | η (%) |
|---|---|---|---|---|---|
| I | 03.82 | 770 | 65.9 | 40 | 1.95 |
| II | 05.92 | 750 | 59.7 | 45 | 2.65 |
| III | 08.08 | 767 | 57.7 | 55 | 3.58 |
| IV | 07.42 | 755 | 59.1 | 52 | 3.31 |
| V | 05.57 | 730 | 54.2 | 42 | 2.29 |
| VI | 02.87 | 727 | 58.9 | 27 | 1.23 |

As shown in TABLE 2, the dye-sensitized solar cells made using pure anatase titania nanoparticles, corresponding to sample I, had a higher power conversion efficiency and current density than dye-sensitized solar cells made using pure rutile titania nanoparticles, corresponding to sample VI. Dye-sensitized solar cells made using pure anastase titania nanoparticles are more efficient and have a higher current density because electron transport is slower in rutile titania layers than in anatase titania layers due to differences in inter-particle connectivity associated with the particle packing density. Therefore, pure anatase titania nanoparticles corresponding to sample I are preferred for the preparation of dye-sensitized solar cells.

The power conversion efficiencies of dye-sensitized solar cells made using titania nanoparticles corresponding to sample II and sample II are 36% and 84% higher than that of dye-sensitized solar cells made using titania nanoparticles corresponding to sample I, respectively. The decreased efficiency of dye-sensitized solar cells made using titania nanoparticles corresponding to sample I are due to the surface layer of the residual organic compound discussed earlier, which acts as a barrier for the adsorption of dye molecules. As such, dye-sensitized solar cells made using mixed anatase and rutile titania nanoparticles, corresponding to samples III-V, have higher power conversion efficiencies and short circuit currents than dye-sensitized solar cells made using pure anatase or rutile titania nanoparticles, corresponding to samples I and VI.

Moreover, anatase and rutile titania nanoparticles used together in dye-sensitized solar cells exhibit a synergistic effect to improve photovoltaic performance. In particular, photo-excited electrons injected into the rutile titania nanoparticles can migrate to the conduction band of the anatase titania nanoparticles, enhancing the power conversion efficiencies and short circuit currents of dye-sensitized solar cells.

Figure 10:
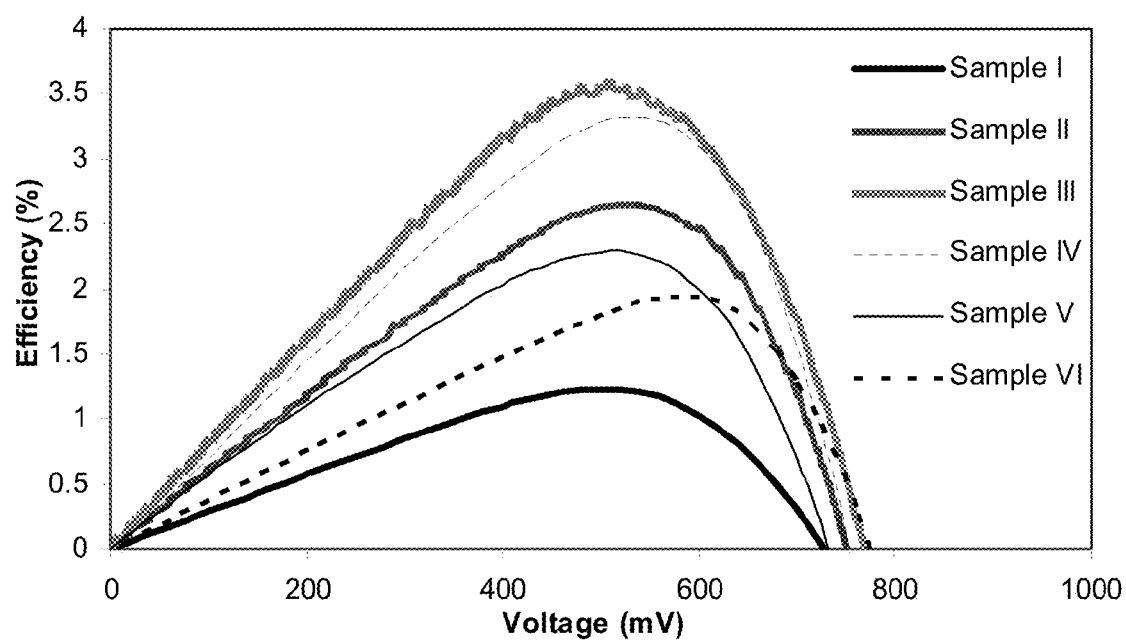
FIG. 10 illustrates power conversion efficiency-voltage characteristics of dye-sensitized solar cells prepared according to the DYE-SENSITIZED SOLAR CELL PREPARATION EXAMPLE.

Referring to FIG. 10, the power conversion efficiency-voltage characteristics of the prepared dye-sensitized solar cells using the titania pastes including the titania nanoparticles of samples I-VI are illustrated. The dye-sensitized solar cells prepared using the mixed anatase and rutile titania nanoparticles corresponding to sample III with a phase composition of 75.5 wt % anatase and 24.5 wt % rutile nanoparticles had the maximum power conversion efficiency and short circuit current of 3.58% and 8.08 mA/cm², respectively. The dye-sensitized solar cells prepared using the titania nanoparticles corresponding to sample III had a higher photovoltaic performance than dye-sensitized solar cells prepared using the titania nanoparticles corresponding to sample IV because of the smaller crystallite size of the titania nanoparticles of sample III, resulting in a higher surface area and enhanced dye adsorption.

It is to be understood that the disclosed implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a," "an," and "the" include plural referents unless the content clearly indicates otherwise.

Reference in the specification to "one implementation" or "an implementation" means that a particular feature, structure, characteristic, or function described in connection with the implementation is included in at least one implementation herein. The appearances of the phrase "in some implementations" in the specification do not necessarily all refer to the same implementation.

Accordingly, other embodiments and/or implementations are within the scope of this application.

What is claimed is:

1. A method for preparing titania pastes for use in dye-sensitized solar cells, comprising:
   mixing a titanium precursor, a catalyst, and distilled water to prepare a titania sol;
   receiving titania nanoparticles having an average size of less than 100 nm; and
   mixing the titania sol, the titania nanoparticles, and a hydroxypropyl cellulose with an average molecular weight of greater than or equal to 100,000 grams per mol to prepare a titania paste.

2. The method of claim 1, wherein the titanium precursor is titanium tetraisopropoxide.

3. The method of claim 1, wherein the catalyst is an acid.

4. The method of claim 1, wherein the titanium precursor, the catalyst, and the distilled water are mixed at room temperature.

5. The method of claim 1, wherein receiving the titania nanoparticles comprises receiving the titania nanoparticles from another source.

6. The method of claim 1, wherein receiving the titania nanoparticles comprises synthesizing the titania nanoparticles by:
   drying a portion of the titania sol to form titania nanoparticles; and
   annealing the titania nanoparticles at a temperature between 300° C. and 1000° C.

7. The method of claim 1, wherein the weight ratio of the hydroxypropyl cellulose to the titania nanoparticles is between 10:90 and 40:60.

8. The method of claim 1, wherein a molar ratio of the titania nanoparticles to the titanium precursor in the titania sol is between 5:1 and 8:1.

9. The method of claim 1, wherein the titania sol and the titania nanoparticles are mixed at room temperature.

10. The method of claim 1, wherein mixing the titania sol, the titania nanoparticles, and the hydroxypropyl cellulose to prepare the titania paste comprises mixing the titania sol, the titania nanoparticles, the hydroxypropyl cellulose, and a metal solution or powder to prepare a metal-doped titania paste.

11. The method of claim 1, wherein mixing the titania sol, the titania nanoparticles, and the hydroxypropyl cellulose to prepare the titania paste comprises mixing the titania sol, the titania nanoparticles, the hydroxypropyl cellulose, and a metal oxide solution or powder to prepare a metal oxide-doped titania paste.

12. The method of claim 1, further comprising:
coating a substrate with the titania paste to prepare a titania coated substrate;
annealing the titania coated substrate at a temperature of 400° C.; and
sensitizing the annealed titania coated substrate with a dye solution to prepare a sensitized titania photoanode electrode for use in dye-sensitized solar cells.

13. The method of claim 3, wherein the acid is hydrochloric acid.

14. The method of claim 6, wherein the titania nanoparticles are annealed at a temperature between 400° C. and 700° C.

15. The method of claim 14, wherein the titania nanoparticles are annealed at a temperature of 500° C.

16. The method of claim 10, wherein the metal solution or powder includes a metal selected from the group consisting of silver, zinc, cerium, and zirconium.

17. The method of claim 11, wherein the metal oxide solution or powder includes a metal oxide selected from the group consisting of tantalum oxide, erbium oxide, zirconia, gallium oxide, silver(I,III) oxide, and ceria.

* * * * *